(12) United States Patent
Valentine et al.

(10) Patent No.: US 7,194,534 B2
(45) Date of Patent: Mar. 20, 2007

(54) DISPLAY OF PHONES ON A MAP OF A NETWORK

(75) Inventors: Simon Peter Valentine, Hemel Hempstead (GB); Christopher Robert Linzell, St. Albans (GB); Lee Anthony Walker, Watford (GB); Russell Kennett Bulmer, Hemel Hempstead (GB)

(73) Assignee: 3Com Corporation, Marlborough, MA (US)

(*) Notice: Subject to any disclaimer, the term of this patent is extended or adjusted under 35 U.S.C. 154(b) by 756 days.

(21) Appl. No.: 09/825,707

(22) Filed: Apr. 4, 2001

(65) Prior Publication Data

US 2001/0029536 A1 Oct. 11, 2001

(30) Foreign Application Priority Data

Apr. 7, 2000 (GB) ................................ 0008672.8

(51) Int. Cl.
*G06F 15/173* (2006.01)
*G06F 15/16* (2006.01)

(52) U.S. Cl. ................. 709/224; 709/223; 709/245

(58) Field of Classification Search ........ 709/220–224, 709/227–228
See application file for complete search history.

(56) References Cited

U.S. PATENT DOCUMENTS

| | | | |
|---|---|---|---|
| 5,276,789 A | 1/1994 | Besaw et al. ............... 395/140 |
| 5,875,242 A | 2/1999 | Glaser et al. ............... 379/207 |
| 6,229,540 B1 * | 5/2001 | Tonelli et al. .............. 715/735 |
| 6,377,987 B1 * | 4/2002 | Kracht ....................... 709/220 |
| 6,442,144 B1 * | 8/2002 | Hansen et al. .............. 370/255 |
| 6,509,830 B1 * | 1/2003 | Elliott .................... 340/286.02 |
| 6,516,345 B1 * | 2/2003 | Kracht ....................... 709/220 |
| 6,594,696 B1 * | 7/2003 | Walker et al. .............. 709/223 |
| 6,665,713 B1 * | 12/2003 | Hada et al. ................. 709/220 |
| 6,716,101 B1 * | 4/2004 | Meadows et al. ........ 455/456.1 |

FOREIGN PATENT DOCUMENTS

EP 0772318 A2 5/1997

OTHER PUBLICATIONS

Microsoft Computer Dictionary 5th Edition, pp. 259.*

* cited by examiner

*Primary Examiner*—Ario Etienne
*Assistant Examiner*—Hussein El-chanti
(74) *Attorney, Agent, or Firm*—McDonnell Boehnen Hulbert & Berghoff

(57) ABSTRACT

In a computer network, a process of discovery of the network, including discovery of network phones, and means for retrieving an icon relating to the phones and displaying a network map including network phones in the network map.

14 Claims, 4 Drawing Sheets

DISPLAY OF PHONES ON A MAP OF A NETWORK

BACKGROUND OF THE INVENTION

The present invention relates to the display of Ethernet phones on a map of a network such as a LAN (Local Area Network) or other network.

The present invention relates to the process of discovery and display of devices on a network, that is a network of electronic devices comprising, for example, workstations, personal computers, servers, hubs, routers, bridges, switches, (hereinafter referred to as devices of the network), and links between these devices which may be in the form of physical cable or wireless links. The network may be a local area network (LAN), such as an Ethernet network, wide area network (WAN) or other types, including wireless networks, and may operate in accordance with any desired protocol.

Computers and other devices connected to a network may be managed or unmanaged devices. A managed device has processing capability which enables it to monitor data traffic sent from, received at, and passing through the ports of the device. Monitored data associated with the ports of the network device is stored in memory on the network device. For example, data relating to the origin of a data packet which is received at a port is stored along with the identify of the relevant port.

After such a network has been installed, it is desirable for the person appointed network manager to be able to understand the technical operation of the network. In known network management systems, relevant data is retrieved from the managed devices, compiled and displayed ("discovered").

The topology of the network may be deduced by operation of the network manager's computer by the process of discovery in which each of the devices of the network are interrogated to thereby produce on a network manager's workstation details of the network and its operation, preferably in the form of a network map which may be displayed on a visual display unit showing the devices and links between the devices. At its simplest, and where the device is a "managed" device, this information is usually provided by interrogation using a known protocol, such as, but not limited to, the SNMP (Simple Network Management Protocol), of the so-called 'agent' of each device which stores the device's unique MAC address, the type of device and the MAC addresses embedded in the data passing into a particular port which thereby gives the MAC addresses of the origin of the data and hence the MAC address of the devices which are connected to the ports directly or indirectly.

It has recently been proposed to include so called Ethernet telephones in networks (particularly LANs), in addition to the usual workstations, routers and switches. These Ethernet telephones (which may be controlled by a telephone controller, usually a network call processor (NCP)) allow one to use the existing wiring or other network medium to implement a telephone system. This is particularly useful in a business environment where a single set of cables or other medium may be provided to connect both the computer network and the telephone network.

Discussions with users of such systems which include Ethernet phones have indicated that there is a considerable problem in trying to diagnose problems, particularly with telephones, and it has not hitherto been possible to easily identify how the telephones are connected into the system and to easily identify them. Because they are unmanaged devices, the telephones will normally appear as generic devices. Prior art systems have provided, effectively, a telephone directory for users of the system but have not provided details of the linking of the Ethernet phones into the network.

It is clearly desirable that the network manager of the computer network should be able to similarly view the availability and placement (ie the topology) of phones on the same network.

SUMMARY OF THE INVENTION

The present invention provides a method of discovery of the or each phone on a network, and using this information to insert an icon representing a phone in the relevant position in a display of the topology of the network.

The present invention also provides a computer program on a computer readable medium or embodied in a carrier wave for use in discovery of the or each phone on a network, said computer program comprising:
  program step for establishing the topology of the network including the or each phone; and
  program step for using this information to insert an icon representing the relevant phone into a display of the topology of the network.

BRIEF DESCRIPTION OF THE DRAWINGS

A preferred embodiment of the invention will now be described by was of example only and with reference to the accompanying drawings in which.

DESCRIPTION OF THE PREFERRED EMBODIMENTS

Figure 1:
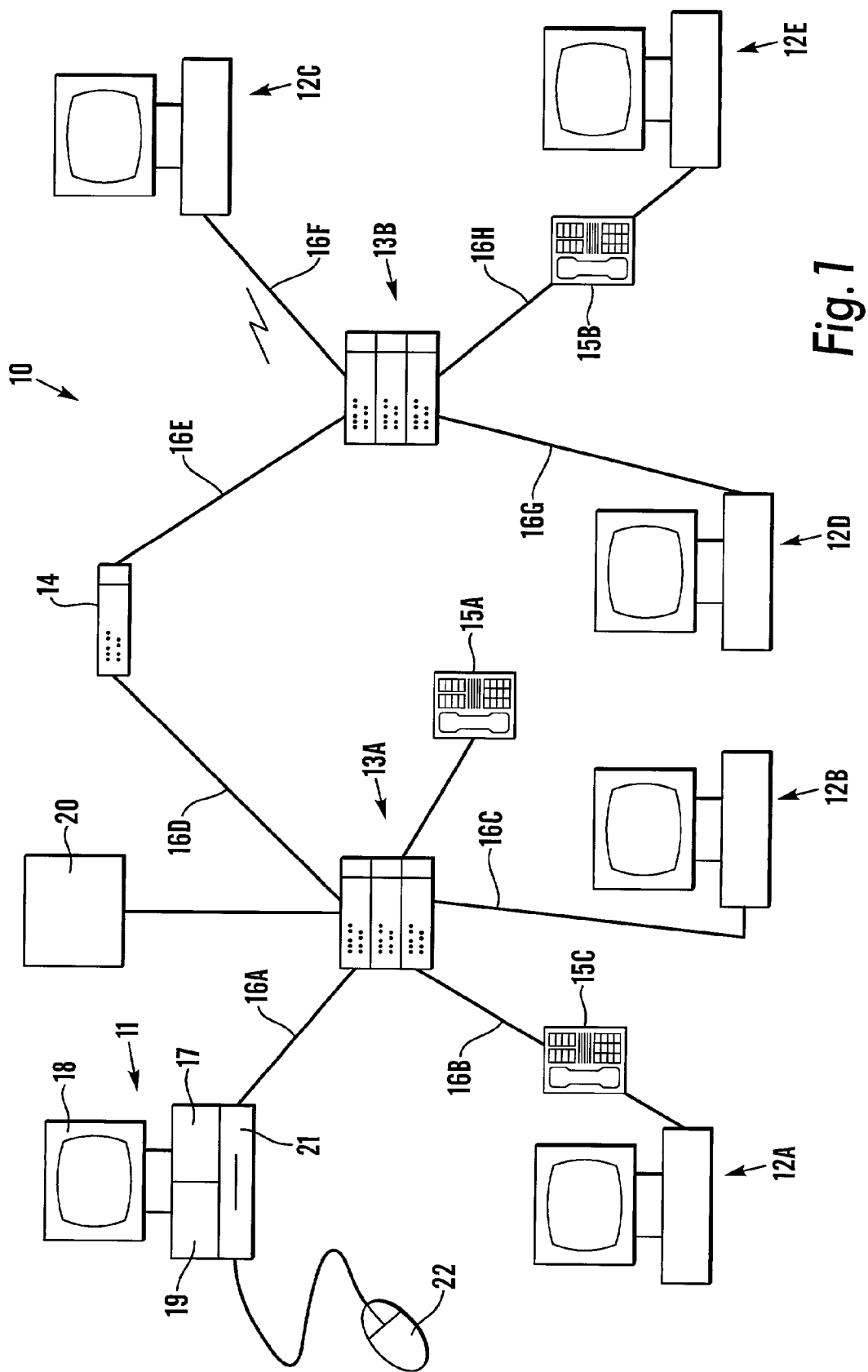
FIG. 1 is a diagrammatic view of a network incorporating a preferred embodiment of the invention.

Referring to FIG. 1 there is shown a physical network 10 comprising a plurality of devices in the form of a network supervisor's workstation or computer 11, other workstations 12B–E, hubs 13A, 13B, switch 14, Ethernet phones 15A–C, phone 15A being directly connected to hub 13A, and phone 15B, 15C being connected between hub 13B and workstation 12E and between hub 13A and workstation 12A respectively and a network call processor (NCP) 20 which operates the telephones 15 over the network. The network is a simple network and is set out for purposes of illustration only. Other configurations and arrangements, may be used.

The devices are connected together by means of links 16A–H which may be hard wired and utilise any desired protocol, and link 16F which is a wireless link.

The network supervisor's workstation includes, in addition to a visual display unit 18, a central processing unit or signal processor 19, a selector which may be in the form of a mouse 22, a program store 21 which may comprise, for example, a CD drive, a floppy disk drive or a zip drive, and a memory 17 for storing a program which may have been loaded from the program store 21 or downloaded for example via Internet from a website.

To discover the network, using a protocol such as SNMP, the network supervisor's computer 11 interrogates each device and analyse the network, and stores in the memory 17 the information relating to the devices within the network and the links between the devices. In essence, many devices include a so-called agent which stores information about the device such as its unique MAC number, its Sys Object ID (which identifies what the device is, what model type it is, how many ports it has and how they are connected), and the MAC address of the origin of the data which at least some of the ports have received and hence to which they are directly or indirectly connected. The computer 11 interrogates the agents of each device to obtain the said information.

In a preferred arrangement, the computer 11 may, on command from the selector 22, process signals from the memory 17 by the signal processor 19 and provide on the visual display unit 18 a network map showing each of the devices and the links therebetween. In the examples shown, the network is simple but of course in many instances the network will be considerably more complex and it may be necessary to arrange that the visual display unit 18 only shows a simplified version or only part of the network at any one time.

As mentioned above, however, whilst the network call processor 20 may support (ie communicate using) a protocol such as the SNMP protocol and hence will be discovered and placed by the computer 11 in its correct location on the network map, the Ethernet phones do not support the SNMP protocol. Thus discovering the network using SNMP (or indeed any other related protocol) will mean that the Ethernet phones will appear as unmanaged generic devices, in other words, the SNMP protocol will not allow for proper discovery of those phones. However although it does not know anything about these generic devices, in the case of Ethernet phones, it does establish their MAC address. The inventors of this invention have discovered that the identity and details of the Ethernet phones 19 can be deduced by using a different system to the rest of the network.

The NCP 20 is a processor which operates the telephones 15 and provides similar services provided by a PBX telephone exchange in, for example, an office network. The NCP 20 includes a memory which contains information (which may be in the form of a custom web page) containing a list of the telephones connected to the network, the MAC address of each telephone, the name of the person whose telephone it is, the extension number, etc. Thus, the NCP includes a telephone directory which includes the MAC addresses of each phone. In order to discover the topology of the Ethernet phones in the network the network supervisor's computer 11 carries out the steps set out in FIG. 5. For example, the web page might typically be arranged so that there is provided a list, the first piece of information on each line being the phone number, the second person using the phone, and the third MAC address. The computer parses through the list and each time it comes to a MAC address (which it recognises from the layout), it then takes the previous two pieces of information for later use.

The initial step is to discover the network as described above and during that discovery process using SNMP it discovers the NCP 20. On discovering that there is an NCP, the computer 11 loads the web page from the NCP 20 which contains the list of phones etc. The computer 11 then parses (that is, search) the web page to extract the MAC address of each phone and the other information associated with each phone.

In the SNMP discovery process, as part of that process, the MAC addresses of components to which each port of each device is connected have been discovered and this then enables one to put together each telephone MAC address (which, as set out above, have been discovered) and the ports to which it is connected. Thus the discovery process determines where the MAC addresses of each phone have been seen on the network.

Devices with those MAC addresses are marked as being phones and are thus displayed on the network map as telephones and other information such as the name of the person whose phone it is, the extension number, etc may be associated with the phone icon on the network map.

Figure 2:
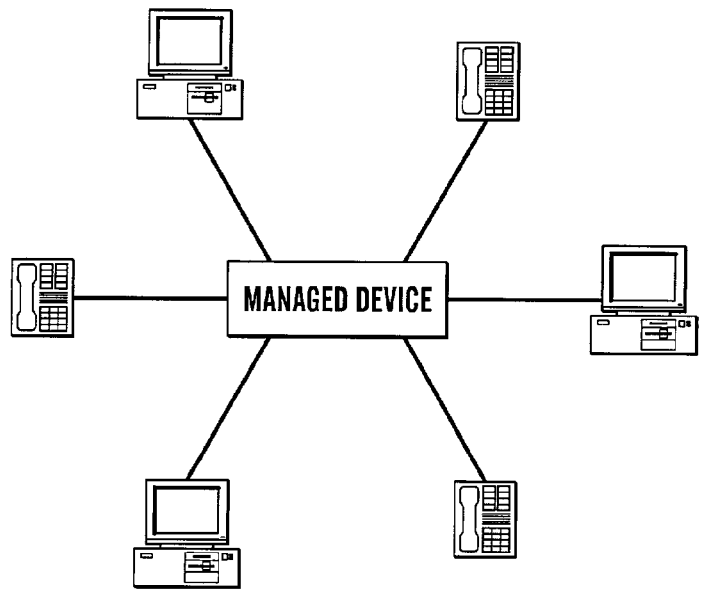
FIGS. 2, 3A, 3B, 4A, 4B, 4C show aspects of the view of part of the network to be described.

However, there are other difficulties. There are at least two possibilities of the way in which the phone is connected to the network. As illustrated in FIG. 2 the Ethernet phones may be directly connected to a port of a managed device by a unique line and thus the process thus far described will produce a network map such as shown in FIG. 2 with sufficient information.

On the other hand, Ethernet phones generally have an input port and an output port and would normally be connected between a managed device and a PC. Thus in that case it will appear to the computer 11 during the discovery process that two or more devices are connected to a single port of a managed device and it can thus be concluded that the basic arrangement is as set out in FIG. 3A, that is between the managed device and the PC.

Figure 3A:
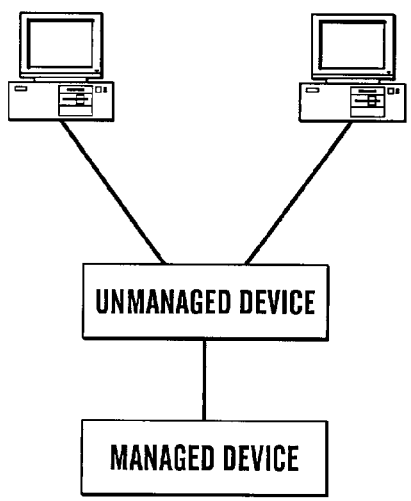
Figure 3B:
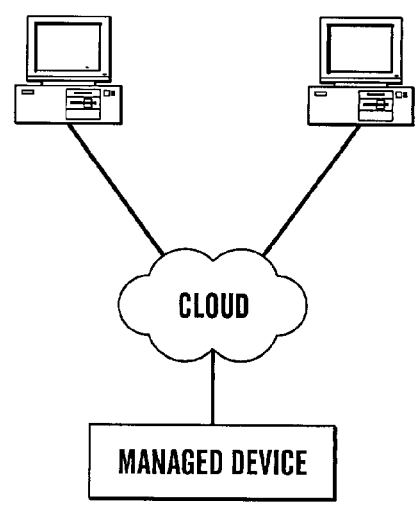

Referring to FIG. 3A, if two or more devices are connected to a managed device port via an unmanaged device then 2 or more MAC addresses will have been learnt on the managed device port and the rest of the topology algorithm will have been unable to locate where these MACs are connected to a single unique port. When this happens the topology algorithm assumes these devices, identified by their MAC addresses, are connected via an unmanaged device that the application is unable to discover and resolve. This ambiguity is represented with the two devices being connected via a cloud to the managed device port. (see FIG. 3B)

Figure 4A:
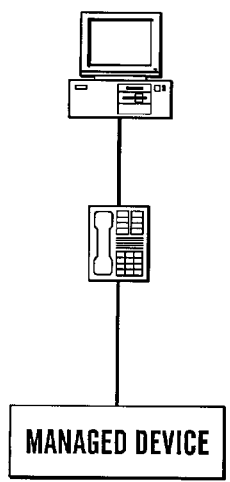
Figure 4B:
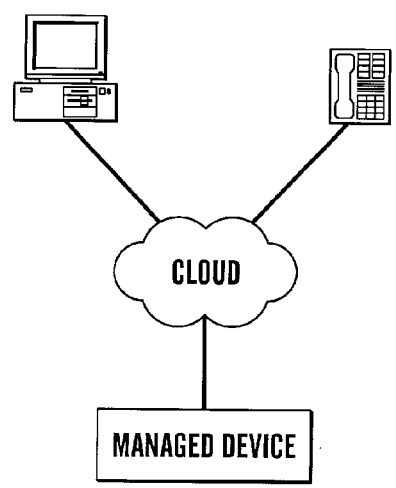
Figure 4C:
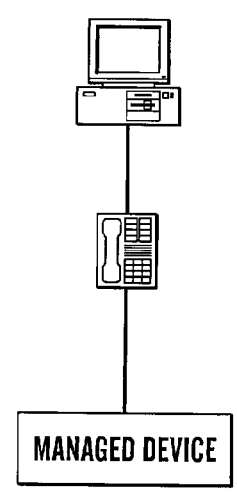

With the Ethernet telephones it is possible to connect a desktop device such as a PC to the network via the Ethernet phone (see FIG. 4A), so that the phone acts as an aggregator or single port hub. This has the advantage of not increasing the number of network connections required to deploy Ethernet Phones. However to keep the cost down phones are unmanaged devices. Hence Ethernet phones and devices connected in this piggy back manner will result in two MAC addresses being seen on the same port of the managed device, and will subsequently be resolved by the topology algorithm as being connected via an unresolved unmanaged aggregating device and hence will be displayed on the map connected to the managed device port via a cloud (See FIG. 4B)

During the discovery process one discovers the MAC addresses of the Ethernet phones on the network by interrogating the Network Call Processor (NCP). If there are 2 MACs learnt on a single port and one of them is the MAC address of a Ethernet phone, and the other is the MAC address of a non-phone device (eg a personal computer) then it is assumed that, the device uniquely identified by the other MAC is connected to the network via the phone and hence one can eliminate the cloud from the topology and map. (See FIG. 4A) The result is an accurate representation of the topology with respect to how the phones are connected to the LAN.

We have described above how the topology of the network including the Ethernet phones may be discovered.

As is known, the topology of the network may be displayed on a visual display unit, for example the VDU of the network manager's computer 11, in the form of a map which sets out the components of the network in visual form and the links between them. For example, whilst FIG. 1 shows in diagrammatic form the layout of the network, it might also in essence comprise a map which may be displayed on the visual display unit. As can be seen, the positions of the phones 15A, 15B, 15C have been discovered by the above process. It then remains for an icon representing a telephone to be retrieved from memory and to be inserted in the network map at the relevant position. This icon can be a simple diagrammatic view such as is shown in FIG. 1.

Furthermore, there may be displayed along side or below the icon of the telephone, information relating to the user, the telephone number, etc, of that phone. Alternatively, that information may be stored in memory and revealed only when the mouse is operated so as to click on to the relevant phone when a dialog box will appear with the information relating to the telephone number and user of the phone.

Problems with a relevant telephone may be indicated by, for example, changing the colour or flashing or otherwise changing the visual display of the telephone, or providing an indication along side the telephone of the likely fault or where the connection is faulty, by highlighting the connection between the phone and the remainder of the network.

We have described how the network may be supervised. The preferred method of the invention is carried out under the control of the network supervisor's workstation or computer and in particular by means of a program controlling the processor apparatus of that computer or elsewhere in the system.

The program for controlling the operation of the invention may be provided on a computer readable medium, such as a CD, or a floppy disk, or a zip drive disk carrying the program or their equivalent, or may be provided on a computer or computer memory carrying the website of, for example, the supplier of the network products. The program may be downloaded from whichever appropriate source and used to control the processor to carry out the steps of the invention as described.

At its simplest, the program may include:

a program step for establishing the topology of the network including the or each phone;

a program step for using this information to insert an icon representing the relevant phone into a display of the topology of the network.

Figure 5:
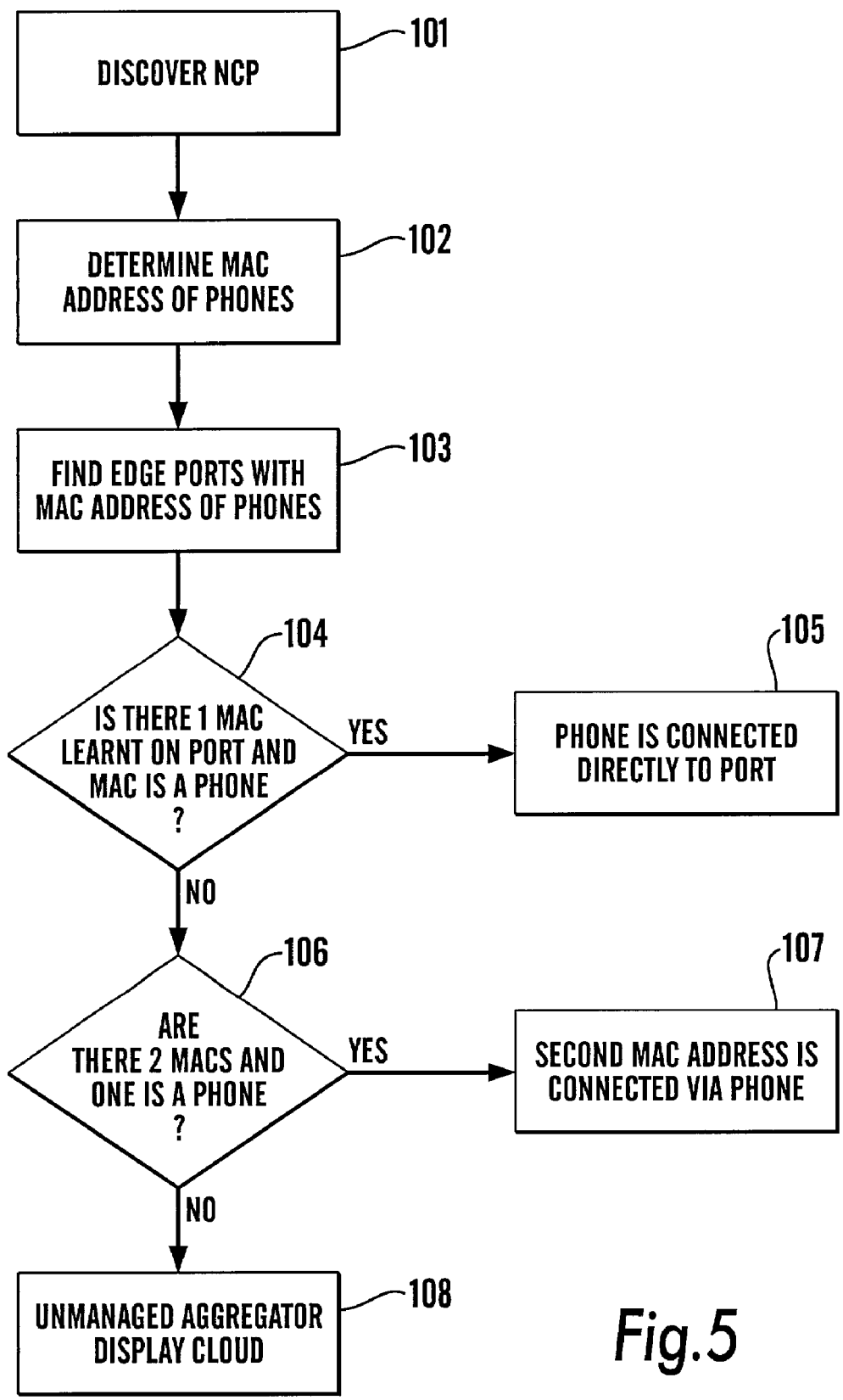
FIG. 5 is a flow chart of the method of discovery of the Ethernet phones on the network.

In more detail the program provides:

a program step (which may use a known protocol such as SNMP) to discover the network, including the managed devices, the NCP and establishing MAC addresses of unmanaged phones (FIG. 5, step 101);

a program step to change from SNMP to HTTP;

a program step to load a web page from the telephone controller;

a program step to parse the web page of the telephone controller to establish correspondence between particular Ethernet phones and MAC addresses (FIG. 5, step 102);

a program step to find ports with MAC address of phones (FIG. 5, step 103);

a program step to determine, in respect of port on which phone MAC address present, is there only single MAC address? (Step 104);

If yes, a program step retrieve and display phone icon on a network map and relevant details connected directly to the port (Step 105);

If no, a program step to determine if there are two MAC addresses and only one is a phone? (Step 106);

If yes, a program step to provide icon of device with second MAC address connected to network via the phone (Step 107);

If no, a program step to display unmanaged aggregator display cloud (ie the situation cannot be resolved) (Step 108).

The invention is not restricted to the details of the foregoing example. For example, we have referred to HTTP, MAC, SNMP, and Web but these are described as examples. Alternative protocols and arrangements will be apparent.

The invention claimed is:

1. A method of discovery and display of one or more Ethernet phones on a network, said method including the steps of:

discovering an Ethernet phone by means of a first protocol, using discovered information to insert an icon representing the phone in a relevant position in a display of the topology of the network, and discovering other devices on the network using a different protocol;

loading a web page to display a network map;

parsing information from the web page to establish correspondence between a particular Ethernet phone and a MAC address;

finding a port associated with the MAC address of the particular Ethernet phone;

retrieving relevant details of the particular Ethernet phone, wherein retrieving the relevant details is conditioned upon determining that only the MAC address of the particular Ethernet phone is associated with the port;

displaying on the network map a phone icon connected to the network via a port icon that is representative of the port, wherein displaying the phone icon connected to a port icon is conditioned upon determining that only the MAC address of the particular Ethernet is associated with the port;

displaying on the network map a device icon connected to the network via the Ethernet phone and port icons, wherein displaying the device icon is conditioned upon determining that (i) two MAC addresses are associated with the port, and (ii) one of the two MAC addresses is associated with the Ethernet phone; and display on the network map an unmanaged aggregator cloud icon connected to the network via the port icon, wherein displaying the unmanaged aggregator cloud icon is conditioned upon determining that (i) at least two MAC addresses are associated with the port, and (ii) the at least two MAC addresses are not associated with the Ethernet phone.

2. A method as claimed in claim 1 in which the phone is discovered using HTTP, and the other devices are discovered using SNMP.

3. A method as claimed in claim 1 in which the display comprises a map of the network.

4. A method as claimed in claim 3 in which the icon is connected to the other parts of the network by a line that is representative of a transmission line connecting the phone to the network.

5. A method as claimed in claim 1 in which the display includes, adjacent the icon, information relating to the phone.

6. A method as claimed in claim 1 in which discovering a phone by means of a first protocol comprises:

obtaining from the network an address of the phone using a first given protocol; and responsive to obtaining the address, obtaining from the network the identity of the phone using a second given protocol.

7. A method as claimed in claim 6 further comprising obtaining from the network details associated with the phone using the second given protocol.

8. A method as claimed in claim 6 in which obtaining from the network the identity of the phone using a second given protocol comprises:
   loading a web page from a telephone controller; and
   parsing information from the web page to establish correspondence between a particular phone and a MAC address.

9. A method as claimed in claim 1 in which said network includes a phone and a device connected to one port of a switch in series, said method including the steps of:
   discovering the phone;
   discovering the other devices and discovering that the other devices are attached to the one port connected to the phone; and
   using discovered information to insert an icon representing the phone and the device in series in the relevant position in a display of the topology of the network.

10. Apparatus for use in the discovery of one or more Ethernet phone on a network comprising:
    means to discover information on an Ethernet phone and another device using respective first and second protocols; and
    means to use the information discovered to insert an icon representing the Ethernet phone in a relevant position in the a display of the topology of the network;
    means for loading a web page to display a network map;
    means for parsing information from the web page to establish correspondence between a particular Ethernet phone and a MAC address;
    means for finding a port associated with the MAC address of the particular Ethernet phone;
    means for retrieving relevant details of the particular Ethernet phone, wherein retrieving the relevant details is conditioned upon determining that only the MAC address of the particular Ethernet phone is associated with the port;
    means for displaying on the network map a phone icon connected to the network via a port icon that is representative of the port, wherein displaying the phone icon connected to a port icon is conditioned upon determining that only the MAC address of the particular Ethernet is associated with the port;
    means for displaying on the network map a device icon connected to the network via the Ethernet phone and port icons, wherein displaying the device icon is conditioned upon determining that (i) two MAC addresses are associated with the port, and (ii) one of the two MAC addresses is associated with the Ethernet phone; and
    means for display on the network map an unmanaged aggregator cloud icon connected to the network via the port icon, wherein displaying the unmanaged aggregator cloud icon is conditioned upon determining that (i) at least two MAC addresses are associated with the port, and (ii) the at least two MAC addresses are not associated with the Ethernet phone.

11. Apparatus as claimed in claim 10 in which the first and second protocols respectively comprise HTTP and SNMP.

12. Apparatus as claimed in claim 10 in which the display comprises a map of the network.

13. Apparatus as claimed in claim 12 in which the icon is connected to the other parts of the network by a line that is representative of a transmission line connecting the telephone to the network.

14. Apparatus as claimed in claim 10 in which the display includes, adjacent the icon, information relating to the phone.

* * * * *